W. J. STILL.
TUBE USED FOR HEATING LIQUIDS.
APPLICATION FILED NOV. 25, 1911.
1,049,939.
Patented Jan. 7, 1913.
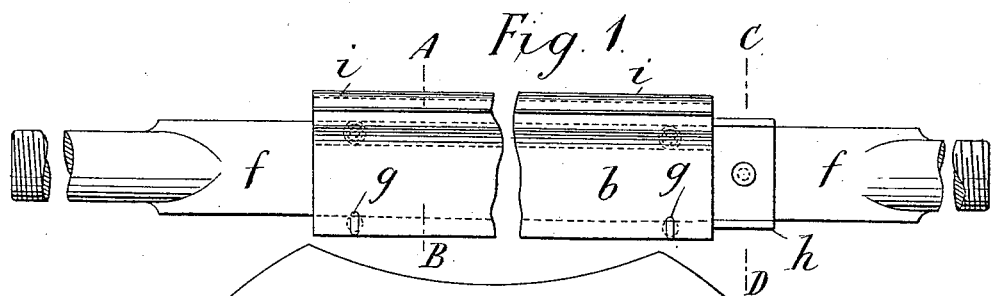
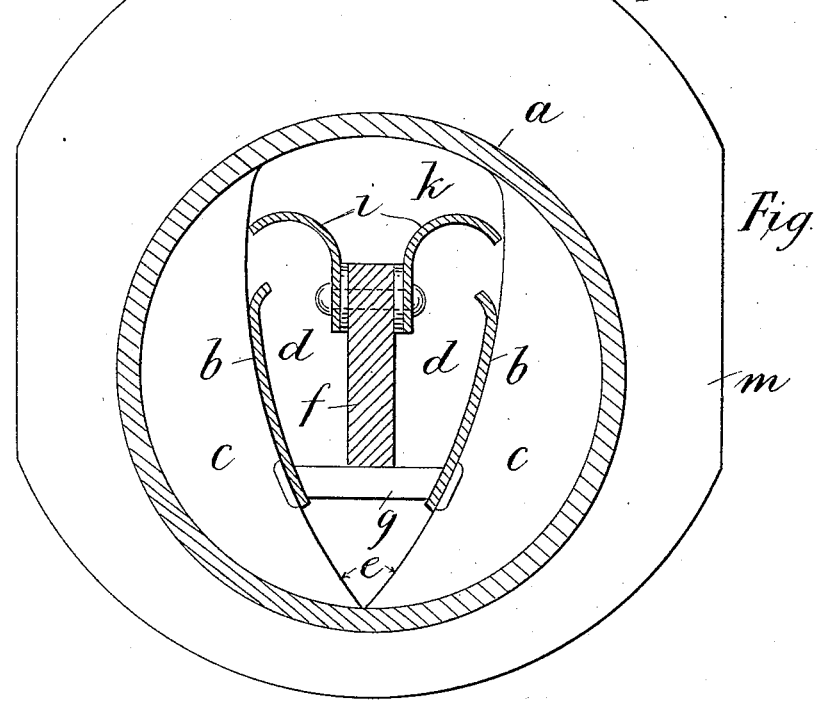
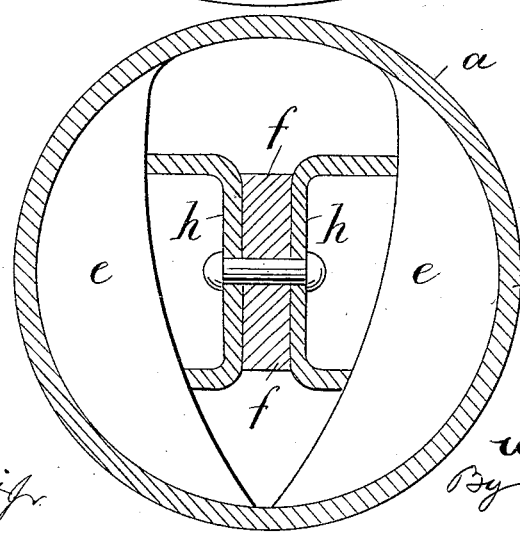
Witnesses
H. A. Pattison
C. P. Wright Jr.
Inventor
W. J. Still
By A. S. Pattison
Atty.

UNITED STATES PATENT OFFICE.

WILLIAM JOSEPH STILL, OF SOUTHALL, ENGLAND.

TUBE USED FOR HEATING LIQUIDS.

1,049,939.  Specification of Letters Patent.  Patented Jan. 7, 1913.

Application filed November 25, 1911. Serial No. 662,490.

*To all whom it may concern:*

Be it known that I, WILLIAM JOSEPH STILL, a subject of the King of Great Britain and Ireland, residing at Southall, in the county of Middlesex, England, have invented Improvements in or Relating to Tubes Used for Heating Liquids, of which the following is a specification.

This invention has reference to tubes used for heating liquids by the external application of heat thereto and particularly to the water tubes used in steam generators of the type wherein the tubes are supported in a more or less horizontal or inclined position and connected at their ends to an upper steam and water drum.

The object of the invention is to constrain the liquid (hereinafter referred to as water) to flow upward from the bottom and sides of the tube to the center of the tube and thence again downward to the bottom and sides of the tube so as to obtain a better circulation of the water than has heretofore been usual; to separate the water, flowing in an upward direction, from that flowing in a downward direction; to accelerate the rate of flow or circulation; to separate from the water, vapor (hereinafter referred to as steam) generated therefrom and to effectually guide such steam away so as to prevent its being entrapped by the circulating water.

The invention is exemplified in the accompanying drawings whereof—

Figure 1 is a side elevation of a water guiding arrangement removed from a tube and Figs. 2 and 3 cross sections through the same and a tube taken on lines corresponding to A B, and C D respectively of Fig. 1.

As shown in the said drawings, a water tube $a$ is provided internally with two longitudinally arranged guide or division plates $b$ spaced apart between the opposite side portions of the tube and the center thereof and so as to leave spaces at $c$ between their upper and lower ends and the inner surface of the tube so that, upon heating externally such a tube charged with water, the latter will be caused to flow upward from the bottom of the tube through the spaces $c$ between the opposite sides of the tube $a$ and guide plates $b$, then over the upper ends of the guide plates, which may be curved inward as shown, to the central portion $d$ of the tube through which it will flow downward toward the bottom of the tube and pass through the openings between the bottom of the tube and the lower edges of the guide plates to the above mentioned spaces $c$ between the tube and guide plates and so on. In this way the water is constrained to flow in definite paths and water flowing in an upward direction is separated from that flowing in a downward direction, whereby the water can be quickly heated and converted into steam.

To increase the efficiency of transfer of heat from hot gas at the exterior of the tube to the water within the tube, and to increase the rate of circulation of the water, the tube may advantageously be provided internally with transversely arranged metal flanges or ribs $e$ that are secured to or formed integrally with the tube and so shaped as to leave through the tube a clear longitudinal passage, preferably of approximately heart shape in section, that is to say, having a rounded top with curved sides converging toward each other at the bottom.

The guide plates $b$ may be connected together and supported in any convenient manner within the tube. When the tube is provided with internal flanges or ribs $e$, as shown, the guide plates $b$ may be supported in position by such flanges or ribs against which they may be held by a longitudinal rod $f$ which may be a tie bolt used for securing the tube to headers at its ends and which, at the part within the tube, may, as shown, be of rectangular section arranged with its longer dimension vertical, such rod or bolt bearing against distance pieces $g$ that connect the lower portions of the guide plates $b$ together.

$h$ represent locking snugs attached to the bar $f$ and adapted to engage the ribs $e$ to prevent rotation of the bar.

For separating steam from the water and guiding it away out of contact with the water, longitudinal separating and guiding plates $i$ are arranged in the upper portion of the tube between the upper edges of the laterally arranged water guiding plates $b$ and the upper portion of the tube. These steam separating and guiding plates $i$ are or may, as shown, be of curved section and arranged so as to overhang the upper edges of the water guiding plates $b$ with their concave sides downward. They may conveniently be secured, as by rivets, to opposite sides of the tie rod or bar $f$ extending through the tube so as to form therewith and the upper portion of the tube a passage $k$ through which the separated steam can readily flow away out of contact with the water.

Water tubes constructed as described may have plain or ribbed external surfaces. Preferably they are provided, as shown in Fig. 2, with external transversely arranged flanges or plates $m$ integral with the internal flanges or ribs $e$.

What I claim is:—

1. A liquid heating element comprising a tube, a pair of upwardly extending and longitudinally arranged liquid separating guide plates therein and means for holding the plates so as to leave spaces between their upper and lower edges and the upper and lower portions of the tube.

2. A liquid heating element comprising a tube, a pair of longitudinal liquid separating guide plates therein, supporting means for said plates and means for holding the plates against the supporting means.

3. A liquid heating element comprising a tube, a pair of longitudinal liquid separating guide plates therein, supporting means for said plates, means for holding the plates against the supporting means and longitudinal plates carried by the holding means and adapted to separate vapor from the liquid.

4. A liquid heating element comprising a tube, internal ribs in said tube arranged in sets at opposite sides of a medial plane, and a longitudinal guide plate associated with each such set of ribs, adapted to constrain heated liquid to pass upwardly between the ribs and descend across the tube in the space between the two guide plates.

5. A liquid heating element comprising a tube, internal ribs in said tube arranged in sets at opposite sides of a medial plane, a longitudinal guide plate associated with each such set of ribs, means connecting the plates together and longitudinally extending dividing means carried by said connecting means and adapted to form a vapor collecting space at the top of the tube.

6. A liquid heating element comprising a tube, internal ribs in said tube arranged in sets at opposite sides of a medial plane, a longitudinal guide plate associated with each such set of ribs, and above the latter plates other longitudinal plates adapted to form a vapor collecting space at the top of the tube and means for holding the plates in position.

7. A liquid heating element comprising a tube, internal ribs in said tube arranged in sets at opposite sides of a medial plane, a longitudinal guide plate associated with each such set of ribs and having its upper edge curved away from the ribs, the upper edges of said guide plates being arranged farther apart than their lower edges, and a pair of longitudinal guide plates above the first named guide plates, each having a concave surface overhanging the upper curved edge of the plate beneath and means for holding the plates in position.

8. A liquid heating element comprising a tube, two sets of internal ribs in said tube said sets being arranged at opposite sides of a medial plane, a connected pair of longitudinal guide plates resting upon the two sets of ribs and downwardly and inwardly inclined toward each other, a removable holding rod extending longitudinally between the said guide plates and a pair of guide plates of curved cross section carried by the holding rod above the first named plates so as to present a concave surface to the upper edge of each of the plates beneath and a central recess between them.

9. In a liquid heating element embodying an internally ribbed tube and longitudinal guide plates therein, a holding rod associated with such guide plates and means preventing rotary motion of the rod relatively to the tube.

Signed at London England this 17th day of November 1911.

WILLIAM JOSEPH STILL.

Witnesses:
CHARLES COPS,
O. J. WORTH.

---

Copies of this patent may be obtained for five cents each, by addressing the "Commissioner of Patents, Washington, D. C."